United States Patent
Marcks, Jr. et al.

(10) Patent No.: US 11,068,030 B2
(45) Date of Patent: Jul. 20, 2021

(54) STAND FOR USE WITH ELECTRONIC DEVICE

(71) Applicant: Otter Products, LLC, Fort Collins, CO (US)

(72) Inventors: Richard K. Marcks, Jr., San Diego, CA (US); Jeffrey C. Wicks, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 99 days.

(21) Appl. No.: 16/714,912

(22) Filed: Dec. 16, 2019

(65) Prior Publication Data

US 2020/0200322 A1    Jun. 25, 2020

Related U.S. Application Data

(60) Provisional application No. 62/781,690, filed on Dec. 19, 2018.

(51) Int. Cl.
*G06F 1/16* (2006.01)
*F16M 11/10* (2006.01)
(Continued)

(52) U.S. Cl.
CPC ............ *G06F 1/166* (2013.01); *E05D 11/084* (2013.01); *F16M 11/041* (2013.01);
(Continued)

(58) Field of Classification Search
CPC ....... G06F 1/166; G06F 1/1628; F16M 11/10; F16M 11/041; A45C 2011/002;
(Continued)

(56) References Cited

U.S. PATENT DOCUMENTS

| 3,023,885 A | 3/1962 | Kindseth |
| 4,029,999 A | 6/1977 | Neumann et al. |

(Continued)

FOREIGN PATENT DOCUMENTS

| CN | 202488509 U | 10/2012 |
| KR | 200446444 | 10/2009 |

(Continued)

OTHER PUBLICATIONS outfityours.com (Top 5 Best Clear iPhone 5S and iPhone 5 Cases—Incase, Otterbox, Griffin, Moshi [retrieved from https://www.youtube.com/watch?v=rWYKJvsDHPw],YouTube.com [online], May 17, 2013 [retrieved Oct. 11, 2017}, 3 pages.

(Continued)

*Primary Examiner* — Nidhi Thaker

(57) ABSTRACT

A stand that is attachable to a back surface of an electronic device or a protective case for the electronic device. The stand includes a base portion, two legs, and two pivoting spring arms. Each leg pivots at a leg axis along an arc between a stowed position and an extended position. The two pivoting spring arms are attached to the base portion at a first end and attached to a respective one of the legs at a second end. Each pivoting spring arm is configured to apply a spring force to the leg to, alternately, force leg toward the stowed position or the extended position depending on the starting position of the leg.

17 Claims, 9 Drawing Sheets

(51) Int. Cl.
*F16M 11/04* (2006.01)
*E05D 11/08* (2006.01)
*H04M 1/04* (2006.01)
*A45C 11/00* (2006.01)
*F16M 13/00* (2006.01)

(52) U.S. Cl.
CPC ........... F16M 11/10 (2013.01); G06F 1/1628 (2013.01); *A45C 11/00* (2013.01); *A45C 2011/001* (2013.01); *A45C 2011/002* (2013.01); *A45C 2011/003* (2013.01); *A45C 2200/15* (2013.01); *E05D 2011/085* (2013.01); *F16M 13/00* (2013.01); *F16M 13/005* (2013.01); *G06F 1/1626* (2013.01); *G06F 2200/1633* (2013.01); *H04M 1/04* (2013.01)

(58) Field of Classification Search
CPC ........ A45C 2011/003; A45C 2011/001; A45C 2200/15; E05D 11/084; E05D 2011/085; H04M 1/04
See application file for complete search history.

(56) References Cited

U.S. PATENT DOCUMENTS

| | | |
|---|---|---|
| 4,097,878 A | 6/1978 | Cramer |
| 4,584,718 A | 4/1986 | Fuller |
| 4,856,658 A | 8/1989 | Novak |
| 4,925,146 A | 5/1990 | Hegarty |
| 4,933,988 A | 6/1990 | Thibault |
| 4,981,243 A | 1/1991 | Rogowski |
| 5,025,921 A | 6/1991 | Gasparaitis et al. |
| 5,123,044 A | 6/1992 | Tate |
| 5,138,523 A | 8/1992 | Benck et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,508,479 A | 4/1996 | Schooley |
| 5,541,813 A | 7/1996 | Satoh et al. |
| 5,671,120 A | 9/1997 | Kikinisi |
| 6,097,593 A | 8/2000 | Faranda et al. |
| 6,115,248 A | 9/2000 | Canova et al. |
| 6,151,206 A | 11/2000 | Kato et al. |
| 6,311,017 B1 | 10/2001 | Mori |
| 6,317,313 B1 | 11/2001 | Mosgrove et al. |
| 6,349,824 B1 | 2/2002 | Yamada |
| 6,375,009 B1 | 4/2002 | Lee |
| 6,445,577 B1 | 9/2002 | Madsen et al. |
| 6,456,487 B1 | 9/2002 | Hetterick |
| 6,490,155 B2 | 12/2002 | Han et al. |
| 6,545,862 B1 | 4/2003 | Gettemy et al. |
| 6,616,111 B1 | 9/2003 | White |
| 6,625,394 B2 | 9/2003 | Smith et al. |
| 6,626,362 B1 | 9/2003 | Steiner et al. |
| 6,701,159 B1 | 3/2004 | Powell |
| 6,762,935 B2 | 7/2004 | Hidewasa |
| 6,865,076 B2 | 3/2005 | Lunsford |
| 6,966,519 B2 | 11/2005 | Salentine et al. |
| 7,050,841 B1 | 5/2006 | Onda |
| 7,072,699 B2 | 7/2006 | Eiden |
| D526,780 S | 8/2006 | Richardson et al. |
| 7,145,767 B2 | 12/2006 | MacHe et al. |
| 7,194,291 B2 | 3/2007 | Peng |
| D542,524 S | 5/2007 | Richardson et al. |
| 7,236,588 B2 | 6/2007 | Gartrell |
| 7,343,184 B2 | 3/2008 | Rostami |
| 7,359,184 B2 | 4/2008 | Lord |
| D574,819 S | 8/2008 | Andre et al. |
| D581,155 S | 11/2008 | Richardson et al. |
| D581,421 S | 11/2008 | Richardson et al. |
| D587,008 S | 2/2009 | Richardson et al. |
| D589,016 S | 3/2009 | Richardson et al. |
| 7,555,325 B2 | 6/2009 | Goros |
| 7,558,594 B2 | 7/2009 | Wilson |
| 7,688,580 B2 | 3/2010 | Richardson et al. |
| 7,845,608 B1 | 12/2010 | Chen et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,049,727 B2 | 11/2011 | Hanson et al. |
| 8,204,561 B2 | 6/2012 | Mongan et al. |
| 8,226,054 B2 * | 7/2012 | Chen .................... F16M 13/005 248/127 |
| 8,442,604 B1 | 5/2013 | Diebel |
| 8,453,344 B2 | 6/2013 | Nishiwaki et al. |
| 8,457,701 B2 | 6/2013 | Diebel |
| 8,490,783 B1 | 7/2013 | Fan |
| 8,509,865 B1 | 8/2013 | LaColla et al. |
| 8,560,031 B2 | 10/2013 | Barnett et al. |
| 8,567,599 B2 | 10/2013 | Beatty et al. |
| 8,599,547 B2 | 12/2013 | Richardson et al. |
| 8,676,281 B1 | 3/2014 | Caulder et al. |
| 8,755,852 B2 | 6/2014 | Hynecek et al. |
| 8,777,002 B2 | 7/2014 | Thomas et al. |
| 8,798,675 B2 | 8/2014 | Salmon et al. |
| 8,800,762 B2 | 8/2014 | Fathollahi |
| 8,950,725 B2 * | 2/2015 | Huang .................... F16M 13/00 248/558 |
| 8,965,458 B2 | 2/2015 | Richardson et al. |
| 9,008,738 B1 | 4/2015 | Dong |
| 9,060,580 B2 | 6/2015 | Tages |
| 9,086,842 B2 * | 7/2015 | Wen .................. G06F 1/181 |
| 9,089,056 B2 | 7/2015 | Rayner |
| 9,098,238 B2 | 8/2015 | Richardson et al. |
| 9,125,297 B2 | 9/2015 | Magness |
| 9,136,897 B2 | 9/2015 | Hynecek et al. |
| 9,153,112 B1 | 10/2015 | Kiani et al. |
| 9,226,057 B1 | 12/2015 | Davis et al. |
| 9,266,664 B2 | 2/2016 | Bau |
| 9,274,556 B2 | 3/2016 | Gallouzi et al. |
| 9,295,174 B2 | 3/2016 | Witter et al. |
| 9,316,026 B2 | 4/2016 | Myers et al. |
| 9,367,090 B2 | 6/2016 | Barnett et al. |
| 9,377,154 B2 | 6/2016 | Hung et al. |
| D762,258 S | 7/2016 | Jenkins |
| 9,408,448 B2 | 8/2016 | Kay et al. |
| D766,226 S | 9/2016 | Wu |
| D766,227 S | 9/2016 | Wu |
| D769,855 S | 10/2016 | Deng |
| 9,462,099 B2 | 10/2016 | Wilson et al. |
| 9,481,490 B2 | 11/2016 | Venida et al. |
| 9,487,376 B2 | 11/2016 | Salentine et al. |
| 9,503,147 B2 | 11/2016 | Witter et al. |
| 9,537,526 B2 | 1/2017 | Wilson et al. |
| 9,540,856 B2 * | 1/2017 | Lin .................. E05D 11/06 |
| 9,545,140 B1 | 1/2017 | Johnson et al. |
| 9,615,476 B2 | 4/2017 | Rayner et al. |
| 9,622,556 B2 | 4/2017 | Fathollahi et al. |
| 9,654,605 B2 | 5/2017 | Goldfain et al. |
| 9,660,684 B2 | 5/2017 | Rayner |
| 9,687,076 B2 * | 6/2017 | Su .................. G06F 1/1626 |
| 9,743,540 B2 | 8/2017 | Magness |
| 9,774,713 B2 | 9/2017 | Guerdrum et al. |
| 9,788,620 B1 | 10/2017 | Parkinson |
| 9,807,211 B2 | 10/2017 | Guerdrum et al. |
| 9,851,758 B2 | 12/2017 | Rowley |
| D808,376 S | 1/2018 | Kim |
| D808,377 S | 1/2018 | Witter et al. |
| 9,871,550 B2 | 1/2018 | Witter et al. |
| 9,946,301 B2 * | 4/2018 | Lan .................. F16M 11/10 |
| D824,376 S | 7/2018 | Lee |
| 10,027,783 B2 | 7/2018 | Dukerschein et al. |
| 10,058,155 B2 | 8/2018 | Guerdrum et al. |
| D827,627 S | 9/2018 | Lee |
| D829,700 S | 10/2018 | Kim |
| 10,103,769 B2 | 10/2018 | Witter et al. |
| 10,136,716 B2 | 11/2018 | Northrup et al. |
| 10,178,903 B2 | 1/2019 | Guerdrum et al. |

(56) References Cited

U.S. PATENT DOCUMENTS

| | | |
|---|---|---|
| 10,206,472 B1 | 2/2019 | Northrup et al. |
| 10,216,223 B2 * | 2/2019 | Hsu .................. G06F 1/166 |
| 2001/0054594 A1 | 12/2001 | Maier-Hunke |
| 2002/0065054 A1 | 5/2002 | Humphreys et al. |
| 2002/0079244 A1 | 6/2002 | Kwong |
| 2004/0150945 A1 | 8/2004 | Mache et al. |
| 2005/0088811 A1 | 4/2005 | Ulla et al. |
| 2005/0213298 A1 | 9/2005 | Doherty et al. |
| 2005/0224508 A1 | 10/2005 | Tajiri et al. |
| 2005/0279661 A1 | 12/2005 | Hodges |
| 2006/0027718 A1 | 2/2006 | Quijano et al. |
| 2006/0066438 A1 | 3/2006 | Altounian et al. |
| 2006/0172765 A1 | 8/2006 | Lev |
| 2006/0237495 A1 | 10/2006 | Chen et al. |
| 2006/0243679 A1 | 11/2006 | Dickerson |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0146985 A1 | 6/2007 | Mick et al. |
| 2007/0158220 A1 | 7/2007 | Cleereman et al. |
| 2007/0297149 A1 | 12/2007 | Richardson et al. |
| 2008/0117578 A1 | 5/2008 | Moscovitch |
| 2008/0163463 A1 | 7/2008 | Hulden |
| 2008/0304692 A1 | 12/2008 | Zhang |
| 2009/0001232 A1 | 1/2009 | Seo et al. |
| 2009/0034169 A1 | 2/2009 | Richardson et al. |
| 2009/0079665 A1 | 3/2009 | Moscovitch |
| 2009/0161903 A1 | 6/2009 | White |
| 2009/0237377 A1 | 9/2009 | Lai et al. |
| 2009/0283184 A1 | 11/2009 | Han |
| 2010/0006468 A1 | 1/2010 | Lin |
| 2010/0090085 A1 | 4/2010 | Corrion |
| 2010/0093412 A1 | 4/2010 | Serra et al. |
| 2010/0122756 A1 | 5/2010 | Longinotti-Buitoni |
| 2010/0141864 A1 | 6/2010 | Lai |
| 2010/0147737 A1 | 6/2010 | Richardson et al. |
| 2010/0195279 A1 | 8/2010 | Michael |
| 2010/0203931 A1 | 8/2010 | Hynecek et al. |
| 2010/0215188 A1 | 8/2010 | Wilcox |
| 2010/0230301 A1 | 9/2010 | Fellig |
| 2011/0064401 A1 | 3/2011 | DeSorbo |
| 2011/0075349 A1 | 3/2011 | Ma et al. |
| 2011/0170256 A1 | 7/2011 | Lee |
| 2011/0192857 A1 | 8/2011 | Rothbaum et al. |
| 2011/0216495 A1 | 9/2011 | Marx |
| 2011/0228459 A1 | 9/2011 | Richardson et al. |
| 2011/0235846 A1 | 9/2011 | Jiang et al. |
| 2011/0294556 A1 | 12/2011 | Carlberg et al. |
| 2012/0018325 A1 | 1/2012 | Kim |
| 2012/0031788 A1 | 2/2012 | Mongan et al. |
| 2012/0037524 A1 | 2/2012 | Thomas et al. |
| 2012/0037536 A1 | 2/2012 | Thomas et al. |
| 2012/0106069 A1 | 5/2012 | Strauser |
| 2012/0111881 A1 | 5/2012 | Gaddis et al. |
| 2012/0170194 A1 | 7/2012 | Lord et al. |
| 2012/0287565 A1 | 11/2012 | Bennett |
| 2013/0027862 A1 | 1/2013 | Rayner |
| 2013/0039521 A1 | 2/2013 | Zhou et al. |
| 2013/0083953 A1 | 4/2013 | Chang |
| 2013/0088813 A1 | 4/2013 | Su et al. |
| 2013/0098788 A1 | 4/2013 | McCarville et al. |
| 2013/0107449 A1 | 5/2013 | Su et al. |
| 2013/0109253 A1 | 5/2013 | Gammon et al. |
| 2013/0117487 A1 | 5/2013 | Leung |
| 2013/0126533 A1 | 5/2013 | Klosky |
| 2013/0175186 A1 | 7/2013 | Simmer |
| 2013/0177181 A1 | 7/2013 | Marcus |
| 2013/0220841 A1 | 8/2013 | Yang |
| 2013/0220847 A1 | 8/2013 | Fisher et al. |
| 2013/0222989 A1 | 8/2013 | Chen |
| 2013/0230202 A1 | 9/2013 | Widner et al. |
| 2013/0240578 A1 | 9/2013 | Yu |
| 2013/0262248 A1 | 10/2013 | Kim et al. |
| 2013/0292269 A1 | 11/2013 | Tages |
| 2013/0292288 A1 | 11/2013 | Willes |
| 2014/0003647 A1 | 1/2014 | Liu |
| 2014/0049142 A1 | 2/2014 | Magness |
| 2014/0065847 A1 | 3/2014 | Salmon et al. |
| 2014/0080553 A1 | 3/2014 | Torset et al. |
| 2014/0097102 A1 | 4/2014 | Piatt et al. |
| 2014/0099526 A1 | 4/2014 | Powell et al. |
| 2014/0128132 A1 | 5/2014 | Cox |
| 2014/0141838 A1 | 5/2014 | Cai et al. |
| 2014/0152890 A1 | 6/2014 | Rayner |
| 2014/0166707 A1 | 6/2014 | Leisey-Bartsch |
| 2014/0168884 A1 | 6/2014 | Wylie |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0200056 A1 | 7/2014 | Liu |
| 2014/0227026 A1 | 8/2014 | O'Neill et al. |
| 2014/0228074 A1 | 8/2014 | Kulkarni et al. |
| 2014/0262848 A1 | 9/2014 | Fathollahi et al. |
| 2014/0262934 A1 | 9/2014 | Fathollahi et al. |
| 2014/0265765 A1 | 9/2014 | Khodapanah et al. |
| 2014/0265767 A1 | 9/2014 | Fathollahi |
| 2014/0299488 A1 | 10/2014 | Andrew |
| 2014/0302896 A1 | 10/2014 | Xu et al. |
| 2015/0061477 A1 | 3/2015 | Wilson |
| 2015/0062787 A1 | 3/2015 | Wilson et al. |
| 2015/0068935 A1 | 3/2015 | Kay et al. |
| 2015/0083615 A1 | 3/2015 | Lay et al. |
| 2015/0111623 A1 | 4/2015 | Hegemier et al. |
| 2015/0133183 A1 | 5/2015 | Alameh et al. |
| 2015/0141090 A1 | 5/2015 | Hwan et al. |
| 2015/0141095 A1 | 5/2015 | Kim |
| 2015/0172431 A1 | 6/2015 | Huang |
| 2015/0189160 A1 | 7/2015 | Auger et al. |
| 2015/0194997 A1 | 7/2015 | Johnson et al. |
| 2015/0194998 A1 | 7/2015 | Fathollahi |
| 2015/0195938 A1 | 7/2015 | Witter et al. |
| 2015/0201723 A1 | 7/2015 | Rayner et al. |
| 2015/0214989 A1 | 7/2015 | Yeh et al. |
| 2015/0220766 A1 | 8/2015 | Russell et al. |
| 2015/0257285 A1 | 9/2015 | Wilson et al. |
| 2015/0257287 A1 | 9/2015 | Tages |
| 2015/0304466 A1 | 10/2015 | Tamatsu |
| 2016/0007705 A1 | 1/2016 | Liebers et al. |
| 2016/0036478 A1 | 2/2016 | Wong |
| 2016/0072933 A1 | 3/2016 | Cox |
| 2016/0080024 A1 | 3/2016 | Wilson et al. |
| 2016/0090767 A1 * | 3/2016 | Park .................. E05D 11/1064 |
| | | 16/319 |
| 2016/0122821 A1 | 5/2016 | Liu et al. |
| 2016/0142093 A1 | 5/2016 | Phang |
| 2016/0164565 A1 | 6/2016 | Witter et al. |
| 2016/0173670 A1 * | 6/2016 | Langhein .............. H04M 1/04 |
| | | 455/575.1 |
| 2016/0179143 A1 | 6/2016 | Bidwell et al. |
| 2016/0183392 A1 | 6/2016 | Kelley |
| 2016/0195898 A1 | 7/2016 | Lau |
| 2016/0198822 A1 | 7/2016 | Lee et al. |
| 2016/0254836 A1 | 9/2016 | Alsberg et al. |
| 2016/0261133 A1 | 9/2016 | Wang |
| 2016/0282905 A1 | 9/2016 | Laine et al. |
| 2016/0286920 A1 | 10/2016 | Lean et al. |
| 2016/0286921 A1 | 10/2016 | Northrup et al. |
| 2016/0295981 A1 | 10/2016 | Lay et al. |
| 2017/0026498 A1 | 1/2017 | Goldfain et al. |
| 2017/0041037 A1 | 2/2017 | Witter et al. |
| 2017/0099922 A1 | 4/2017 | Guerdrum et al. |
| 2017/0099924 A1 | 4/2017 | Fathollahi et al. |
| 2017/0119120 A1 | 5/2017 | Richardson et al. |
| 2017/0237460 A1 | 8/2017 | Rayner |
| 2017/0279478 A1 | 9/2017 | Fathollahi |
| 2017/0327054 A1 | 11/2017 | Yu et al. |
| 2017/0328517 A1 | 11/2017 | Wessels |
| 2017/0353208 A1 | 12/2017 | Wilson et al. |
| 2017/0359096 A1 | 12/2017 | Witter et al. |
| 2017/0360200 A1 | 12/2017 | Cohen |
| 2018/0136695 A1 | 5/2018 | Lo et al. |
| 2018/0167498 A1 | 6/2018 | Drakos |
| 2018/0369599 A1 | 12/2018 | Smith |
| 2019/0094853 A1 | 3/2019 | Overall |

(56) References Cited

U.S. PATENT DOCUMENTS

| | | |
|---|---|---|
| 2019/0141848 A1 | 5/2019 | Sung |
| 2019/0212774 A1 | 7/2019 | Patterson et al. |
| 2019/0222682 A1 | 7/2019 | Ren et al. |
| 2019/0250664 A1 | 8/2019 | Eslava et al. |
| 2019/0281147 A1 | 9/2019 | Sherburne et al. |
| 2019/0286191 A1 | 9/2019 | Correll, Jr. |

FOREIGN PATENT DOCUMENTS

| | | |
|---|---|---|
| KR | 101394285 | 5/2014 |
| WO | 1994000037 A1 | 1/1994 |
| WO | 1999041958 A1 | 8/1999 |
| WO | 2015103599 A1 | 7/2015 |

OTHER PUBLICATIONS

Randomrazr (New Otterbox Symmetry Case—The Slim Protective Case for the iPhone 5S/5C [retrieved from https://wwwyoutube.com/watch?v=zGWZTGamuT0],YouTube.com [online], Mar. 30, 2014 [retrieved Oct. 11, 2017]), 5 pages.

\* cited by examiner

STAND FOR USE WITH ELECTRONIC DEVICE

CROSS REFERENCE TO RELATED APPLICATIONS

This application claims priority to U.S. Provisional Patent Application No. 62/781,690, filed Dec. 19, 2018, the entire contents of which is hereby incorporated by reference in its entirety.

FIELD

The present disclosure relates to stands for use with electronic devices and/or with protective cases for electronic devices.

BACKGROUND

Portable electronic devices are commonly used for communication, entertainment, and/or computing purposes. Portable electronic devices may be devices such as smartphones, cellular phones, mobile communication devices, computers, portable computing devices, mobile computing devices, tablet computers, cameras, video players, smart watches, audio players, fitness devices, electronic media readers, two-way radios, global positioning satellite (GPS) devices, measurement instruments, and/or other types of electronic, computing, or communication devices, including combinations thereof.

Cases, protective cases, covers, protective covers, enclosures, or encasements are sometimes installed on or over housings of these types of electronic devices in order to protect the electronic devices from damage due to exposure to shock, impact, dropping, puncture, dust, dirt, water, snow, rain, mud, chemicals, and/or other potentially damaging forces or elements. The term "case" is used herein to refer to any type of case, cover, protective case, protective cover, enclosure, encasement, shell, or combination thereof. Cases are also sometimes used to supplement the functionality of the device and/or to change the aesthetics of the device.

It is often desirable to use portable electronic devices without having to hold them in your hand. Therefore, apparatuses for holding portable electronic devices in preferred viewing orientations offer an advantage. In one example, it is desirable to hold a portable electronic device in a viewing orientation on a table for purposes of watching video content without having to hold the device. While some stands exist for these purposes, improved stands and stands with improved features are desired. While many of the examples herein are discussed with respect to stands that are attached or attachable to cases or covers for electronic devices, it should be understood that the disclosed stands and stand features may also be configured to be attached, directly or indirectly, to an electronic device. In other examples, the disclosed stands may also be permanently affixed or integrated with either a protective case for an electronic device or with the electronic device itself.

SUMMARY

In one example, a protective case system for use with a portable electronic device having a display screen is provided. The protective case system comprises a protective case and a stand. The protective case is configured for removably receiving the portable electronic device. The stand is attachable to a back surface of the protective case and includes a base portion, two legs, and two pivoting spring arms. Each leg is hingedly attached to the base portion along a respective leg axis and configured to pivot relative to the base portion at the respective leg axis. Each leg is further configured to pivot along an arc between a stowed position and an extended position. The legs are configured to support the protective case and the installed portable electronic device in one or more viewing orientations on a substantially horizontal surface when the legs are in the extended position. The two pivoting spring arms are attached to the base portion at a first end and attached to a respective one of the two legs at a second end. Each pivoting spring arm is configured to apply a spring force to the leg to alternately maintain the leg in the stowed position or in the extended position. The applied spring force varies as the respective leg is transitioned between the stowed position and the extended position and reaches a maximum spring force at an intermediate point between the stowed position and the extended position such that each pivoting spring arm tends to force the respective leg into one of the stowed position or the extended position depending on where the leg is currently located within the arc.

In some examples, only a stand is provided. The stand may be attached to a protective case for an electronic device and/or directly to the electronic device.

Various other embodiments and variations of the techniques and methods are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without some of the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Some of the cases described herein are described as protective cases. However, the apparatuses and techniques disclosed herein are not to be limited to any particular protective characteristic of a case. The apparatuses and techniques may be applicable to various types of cases, covers, and/or encasements which cover an electronic device, either partially or fully, including cases which do not necessarily have any protective characteristics.

As use of portable electronic devices has increased, the ways in which they are used and the environments in which they are used have expanded. There is an increasing number of situations in which users wish to view the devices without holding them. For example, phones and tablet computers are sometimes placed on desks, tables, or trays for purposes of watching video content. In some of these examples, the user would prefer to not have to hold the device in a viewing or upright position and would prefer if the device would remain at or near a preferred viewing angle without continuous user involvement. In other examples, it may be beneficial if an electronic device can remain in a preferred viewing orientation while sitting on a substantially horizontal surface even if a user is not currently viewing it. While some stand solutions exist, improved stands and stand features are desirable.

Figure 1:
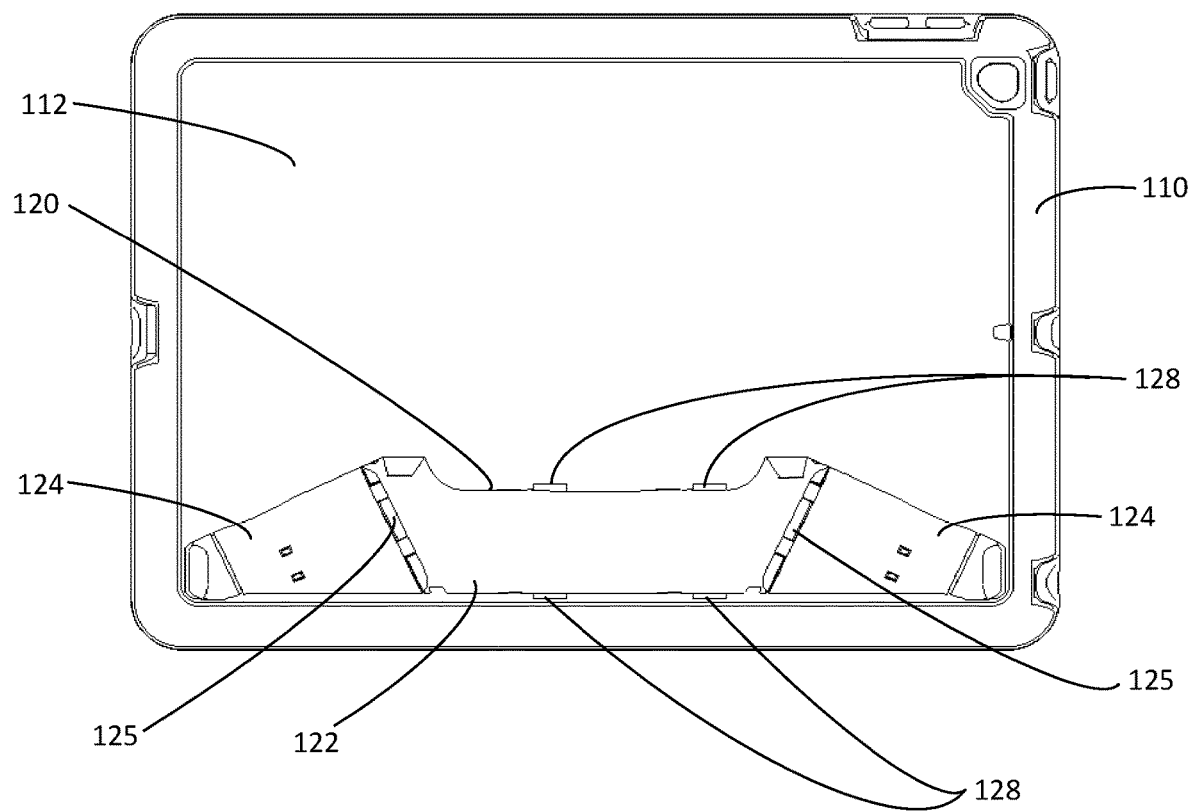
FIG. 1 illustrates a back view of a protective case with an attached stand where the legs of the stand are in stowed positions.

FIG. 1 illustrates a back view of a protective case 110 that may be used to encase, partially encase, receive, partially receive, cover, partially cover, retain, partially retain, protect, partially protect, and/or hold a portable electronic device. The electronic device may be a cellular phone, smartphone, mobile communication device, mobile computing device, portable computing device, tablet, phablet (phone/tablet), portable computer, personal video player, electronic media reader, audio player, handheld scanner, camera, GPS device, or electronic computing or communication device of another type, including combinations thereof.

Protective case 110 may comprise any type of protective shell, cover, covering, enclosure, bumper, frame, sheath, encasement, member, and/or a combination thereof used with an electronic device. Protective case 110 may provide protection against forces or damaging elements such as shock, impact, dropping, puncture, dust, dirt, heat, cold, water, snow, rain, mud, fluids chemicals, and/or other potentially damaging elements. In various instances, protective case 110 may also be waterproof, watertight, and/or water-resistant. In other examples, techniques disclosed herein may be implemented in the form of a cover for an electronic device which provides some or all of the functions disclosed herein while having little or no protective characteristics.

Protective case 110 may include one member or case portion, two members or case portions, or more than two members or case portions. Some of these members may be permanently attached to each other and some of these members may be removably attachable to each other for insertion and/or removal of an electronic device from protective case 110. In some situations, protective case 110 may be a one-piece case or a one-piece assembly into which the electronic device snaps or slides. In other situations, protective case 110 may contain multiple pieces that are assembled on or around the electronic device. Protective case 110 may also include one or more cushion members, cushion layers, and/or cushion portions that are removably attached or permanently attached to any combination of the one, two, or more members. Any portion of protective case 110 may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metallized ceramic, aluminum, aluminum alloy, titanium, wood, carbon fiber, and/or any combination thereof.

The techniques disclosed herein are not to be limited to any particular type, structure, or configuration of a case or cover. In some examples, the improved stands and stand features disclosed herein may also be used directly with the electronic device. In other words, the improved stands disclosed herein may also be attached, directly or indirectly, to the electronic device or to a housing of the electronic without use of a case or cover.

FIG. 1 also illustrates a stand 120 that is removably attached to a back surface 112 of protective case 110. Stand 120 may be attached to protective case 110 permanently, semi-permanently, removably, and/or temporarily. Stand 120 may be removably attached or attachable to protective case 110 using one or more attachment features, such as attachment features 128. Attachment features 128 may include any combination of slots, holes, recesses, channels, lips, posts, arms, snaps, clips, tabs, friction features, magnets, fasteners, and/or adhesives for attaching stand 120 to protective case 110. In one specific example, stand 120 may contain a plurality of arms which are positioned to fit into respective slots of protective case 110. The arms may be flexible and have ridges, lips, tabs, or fingers which tend to hold them in the slots once they have been flexed and inserted into the slots. It should be understood that the improved stand and stand features disclosed herein are not to be limited to any particular means of attaching stand 120 to protective case 110 and/or directly to an electronic device.

Stand 120 includes a base portion 122 and two legs 124. Legs 124 are attached to base portion 122 such that they are each movable with respect to base portion 122. More specifically, each of legs 124 is attached to base 112 using a hinge or other mechanism which allows each of legs 124 to hingedly pivot relative to base portion 122. Each of legs 124 pivots or hinges from base portion 122 on a respective leg axis 125 where the hinge is located such that the end of legs 25 follows and arc through space when moved between positions. Each of legs 124 is illustrated in a stowed or non-extended position in FIG. 1 and may pivot outward as discussed in further detail with respect to other figures below.

In some examples, the stowed leg position illustrated in FIG. 1 permits legs 124 to rest against or near back surface 112 of protective cover 110. In the example of FIG. 1, a display screen or interactive interface of an electronic device installed in protective cover 110 will typically be visible and/or accessible from a side opposite that illustrated in FIG. 1. In other words, a display screen or interactive interface of an electronic device installed in protective cover 110 would be facing primarily into the page in the configuration illustrated in FIG. 1.

Figure 2:
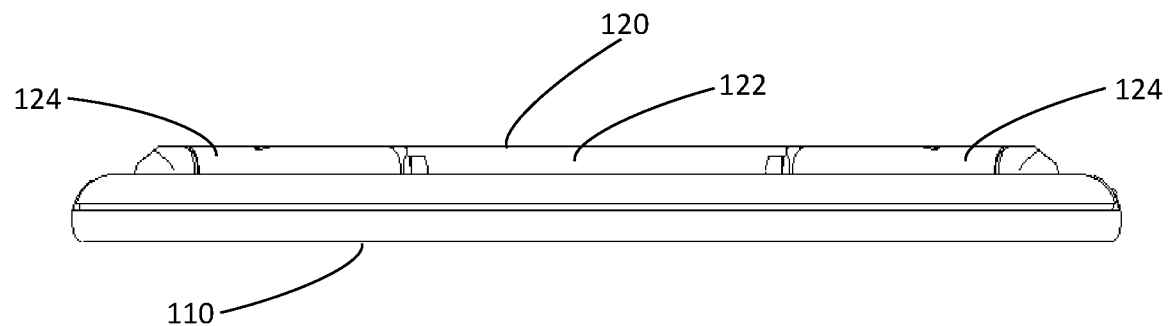
FIG. 2 illustrates a first side view of the protective case and stand of FIG. 1.
Figure 3:
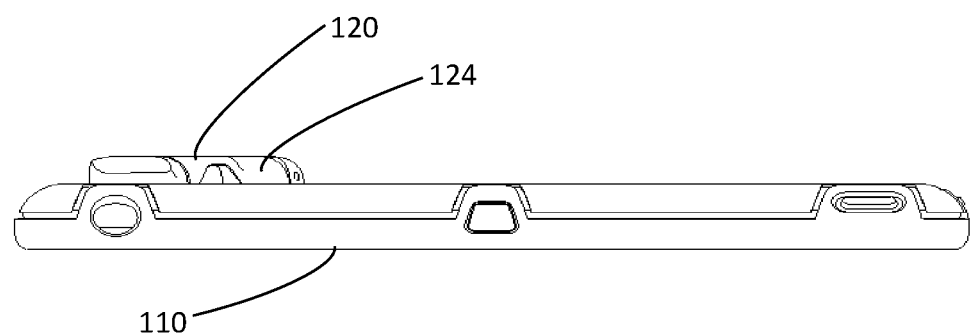
FIG. 3 illustrates a second side view of the protective case and stand of FIG. 1.

FIG. 2 illustrates a first side view of the configuration of protective case 110 and stand 120 of FIG. 1. Stand 120 is attached to the back of protective case 110 and legs 124 are in the stowed position. FIG. 3 illustrates a second side view of the configuration of protective case 110 and stand 120 of FIG. 1. The side illustrated in FIG. 3 is one of the sides which is adjacent to the side illustrated in FIG. 2. In FIG. 3, legs 124 are also still in the stowed or non-extended position.

Figure 4:
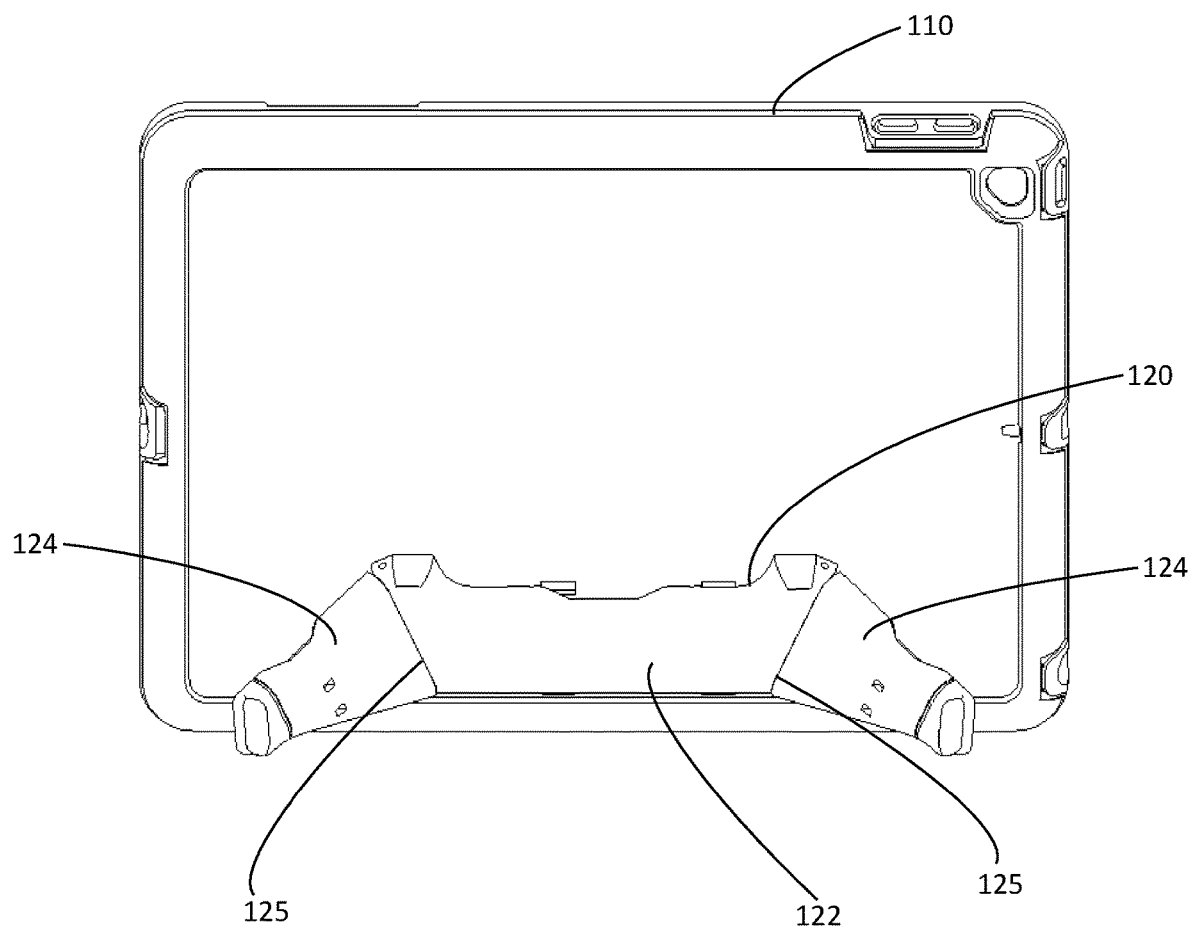
FIG. 4 illustrates a back view of the protective case and stand of FIG. 1 with the legs in extended positions.

FIG. 4 illustrates the protective case 110 and stand 120 of FIG. 1 with legs 124 in extended positions or use positions. The primary difference illustrated in FIG. 4 relative to FIG. 3 is that legs 124 have been pivoted out to the extended or use positions. Legs 124 each pivot or hinge from base portion 122 of stand 120 on a respective leg axis 125. Beneficially, the extension of legs 124 allow protective case 110 to be placed on a substantially horizontal surface and remain in a mostly upright viewing position without external force or involvement. The viewing position will typically be somewhat less than perpendicular to the horizontal surface in order for the assembly to remain stable while reducing the chances of tipping and while providing a preferred viewing angle for a person whose eyes are a distance above the plane of the horizontal surface. In the example of FIG. 4, the assembly is tipped back such that the ends of legs 124 will be in contact the horizontal surface on which the bottom of protective case 110 rests.

Figure 5:
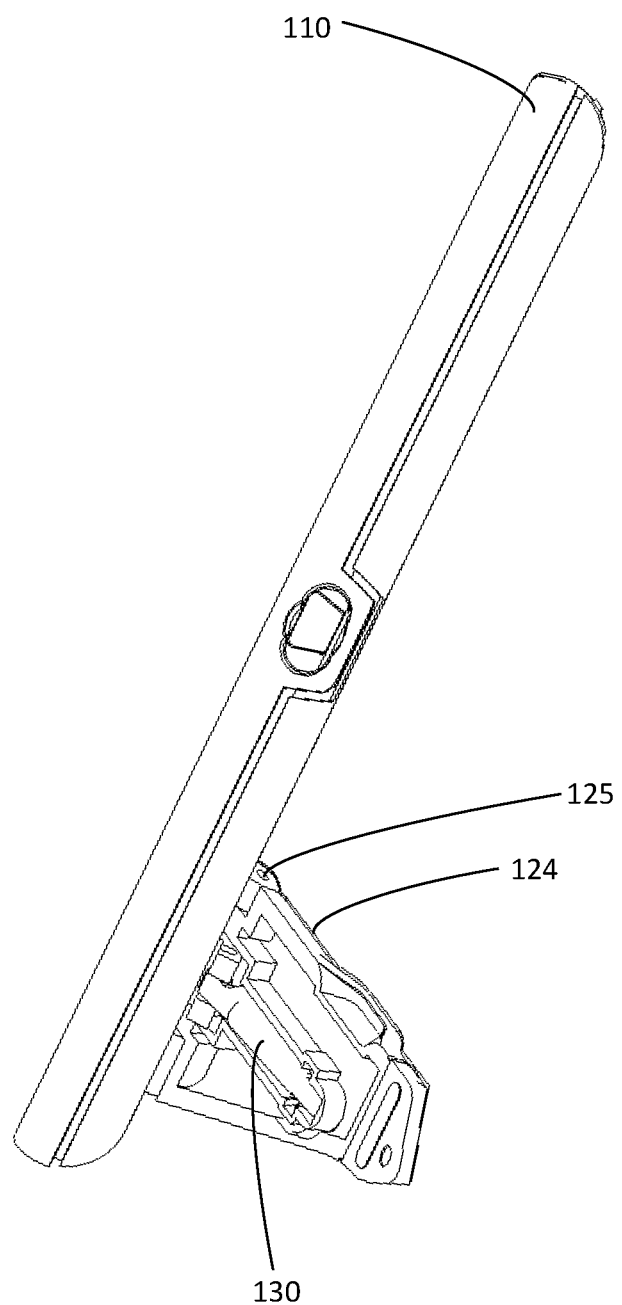
FIG. 5 illustrates a first side view of the protective case and stand of FIG. 1.

FIG. 5 illustrates a side view of the configuration of FIG. 4 in which legs 124 are in an extended position to support protective case 110 in a viewing position. This configuration may be useful when a user is sitting at a desk or table or in an airline seat. FIG. 5 also illustrates a pivoting spring arm 130. Pivoting spring arm 130 is discussed in detail with respect to FIGS. 10-13.

Figure 6:
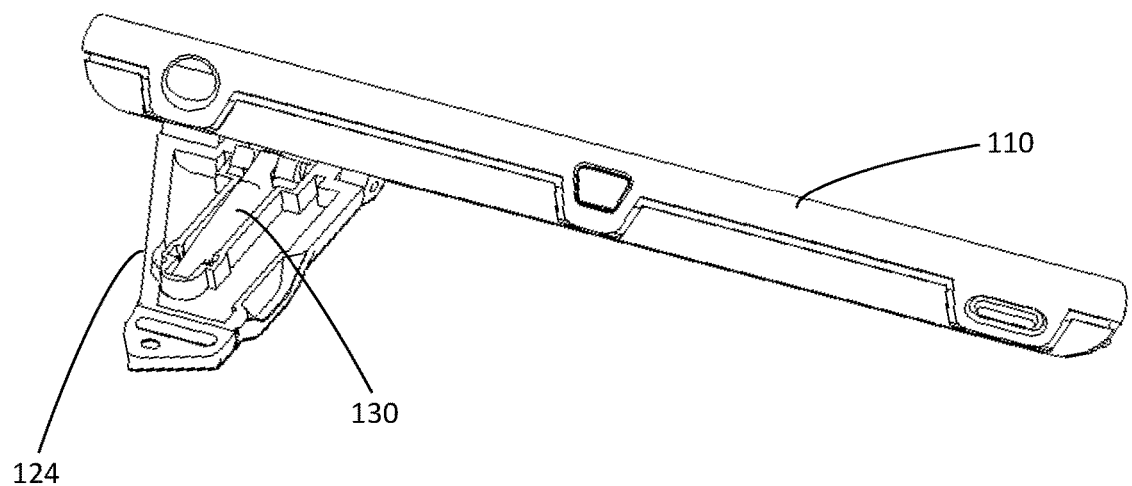
FIG. 6 illustrates a second side view of the protective case and stand of FIG. 1.

FIG. 6 illustrates an alternate side view in which the assembly rests on the horizontal surface in a different orientation. This orientation may be preferable when someone is viewing the electronic device while leaning or standing over the horizontal surface the device is resting on. This orientation may also be useful when the user is interacting with the electronic device since pressing on the display screen will be better supported and the assembly will be less susceptible to tipping relative to the configuration of FIG. 5. For example, someone standing at a customer service counter and using the device for entering or retrieving data may make use of the orientation illustrated in FIG. 6. Many other configurations and viewing angles are possible.

The orientations of FIGS. 5 and 6 are both accomplished using the same stand 120 and with legs 124 in the same extended positions. It should be noted that the ends of legs 124 each have at least two flat regions. Each of the flat regions is positioned and oriented to alternately be in contact with the surface in one of FIG. 5 or 6. It should also be noted that leg axes 125 are each angled relative to the edges of protective case 110 such that legs 124 pivot outward to a position that is beneficial for the orientations of both FIGS. 5 and 6.

Figure 7:
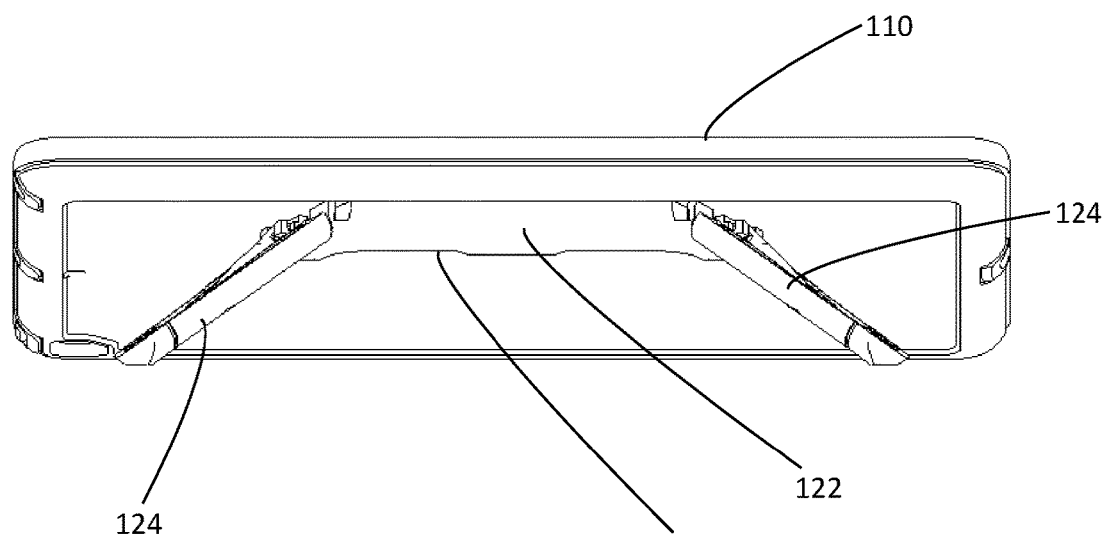
FIG. 7 illustrates a bottom view of the protective case and stand of FIG. 1.
Figure 8:
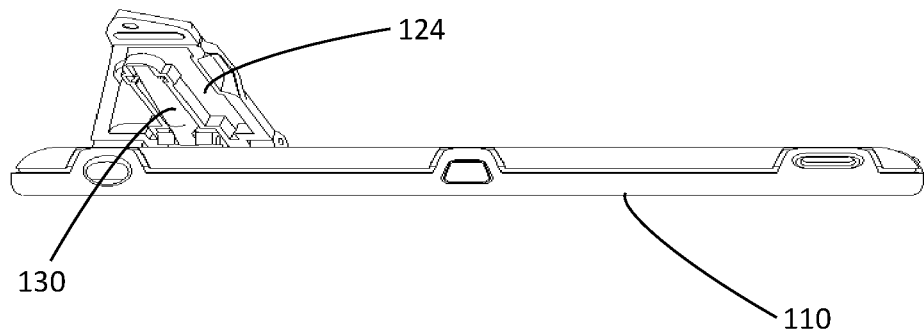
FIG. 8 illustrates a third side view of the protective case and stand of FIG. 1.
Figure 9:
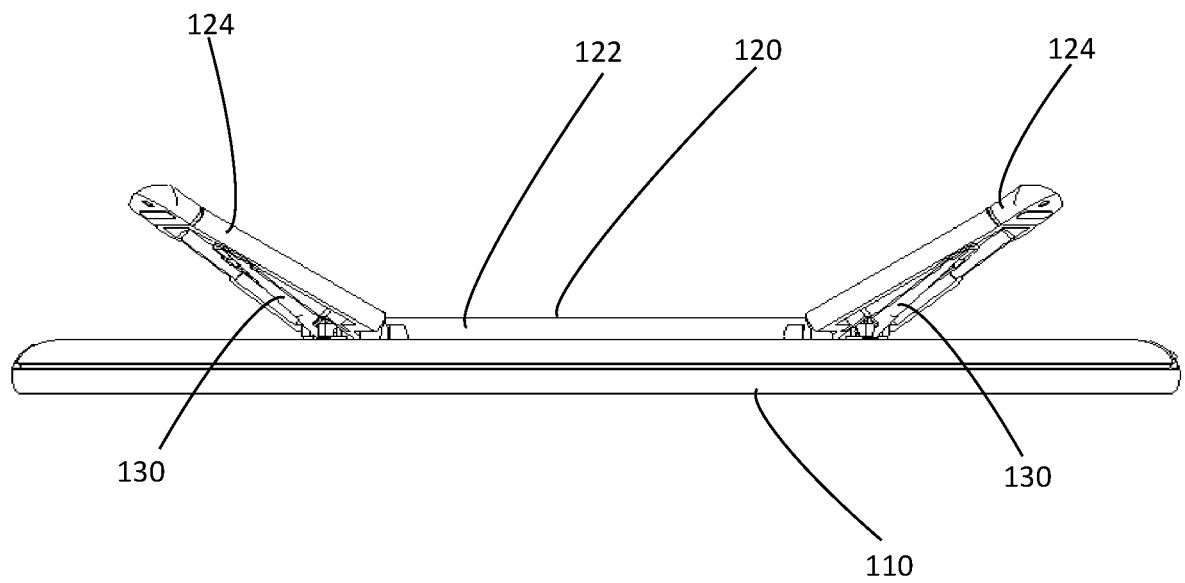
FIG. 9 illustrates a fourth side view of the protective case and stand of FIG. 1.

FIG. 7 illustrates a second side view of the assembly of FIG. 6. FIG. 8 illustrates another side view of the assembly of FIG. 6. In the example of FIG. 8, the primary display area or interactive screen of any installed electronic device would be facing downward into the substantially horizontal surface on which the assembly is resting. FIG. 9 illustrates another side view of the configuration of FIG. 8.

Figure 10:
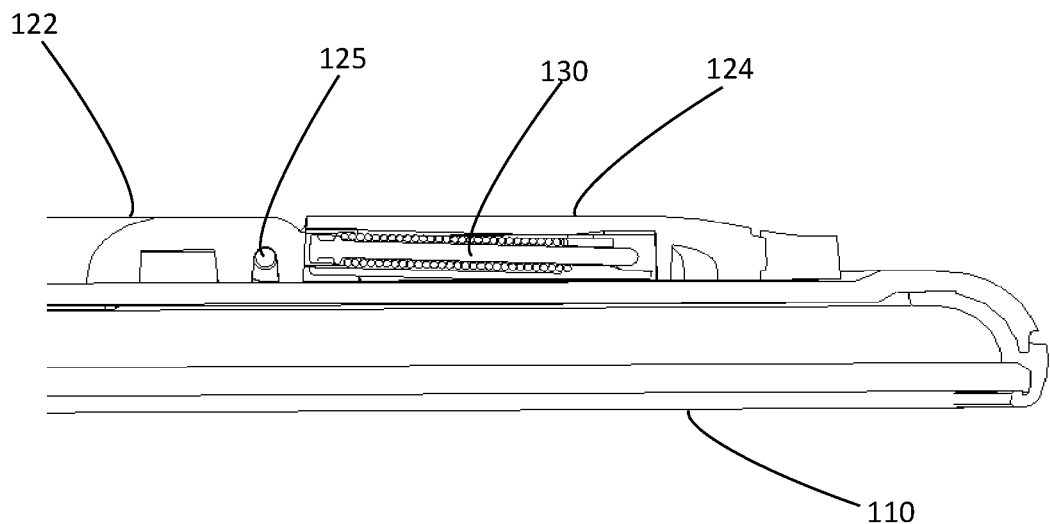
FIG. 10 illustrates a sectional view of the protective case and one of the legs in the stowed position.

FIG. 10 illustrates a close up sectional side view of one end of the assembly in the configuration of FIG. 2. In FIG. 10, leg 124 is in the stowed position. The sectional view of FIG. 10 reveals a pivoting spring arm 130 that is inside or underneath leg 124. Although only one leg 124 is illustrated in FIG. 10 a similar pivoting spring arm may be associated with one or more other legs. As described in further detail below, pivoting spring arm 130 applies varying amounts of spring force to leg 124 as leg 124 is moved thereby tending to help push or force leg 124 into either the stowed position (illustrated) or the extended position. The sectional view of FIG. 10 is cutting through at least leg 124 and pivoting spring arm 130.

Figure 11:
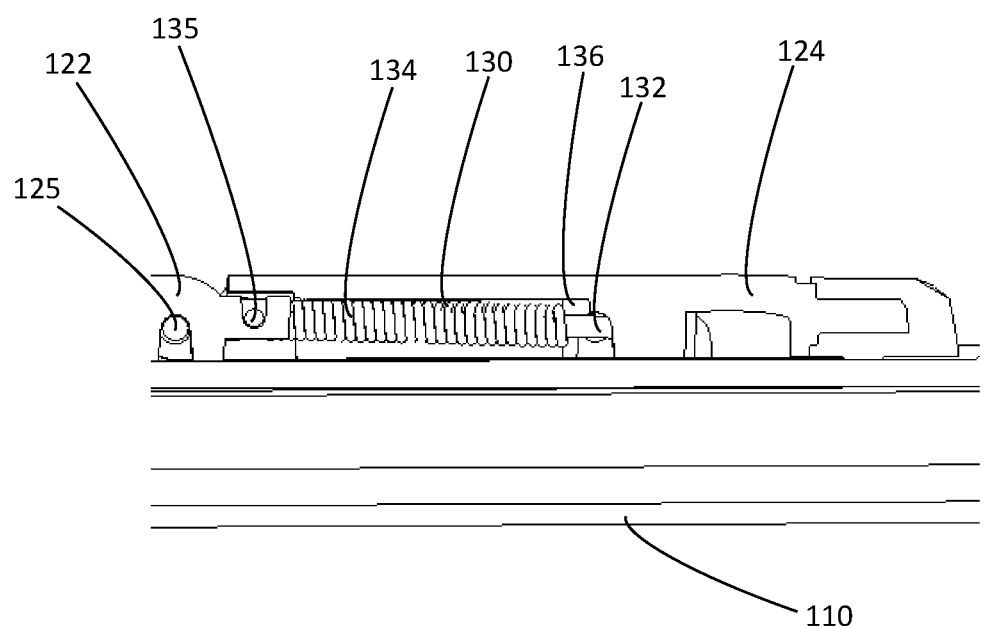
FIG. 11 illustrates a close up view of a pivoting spring arm and a portion of the leg of FIG. 10.

FIG. 11 illustrates an alternate close up sectional side view of one end of the assembly in the configuration of FIG. 2. The sectional view of FIG. 11 is similar to FIG. 10 in that it cuts through a portion of leg 124. However, the section cut of FIG. 11 is taken at a different plane such that pivoting spring arm 130 is visible in the view but it is not cut through as in FIG. 10. FIG. 11 illustrates that pivoting spring arm 130 includes a shaft 132 and a spring 134. Pivoting spring arm 130 is pivotably attached to base 122 at a first end at an attachment point 135 on base portion 122. A collar 136 slides along shaft 132 near a second end of pivoting spring arm 130. Collar 136 may be a feature of leg 124 which is designed to fit around some or all of shaft 132 (as illustrated) or may be a separate component which is otherwise attached to leg 124.

Spring 134 is captured by shaft 132 and is in a partially compressed state such that it exerts spring force against collar 136. This exerted spring force against collar 136 results in force being exerted against leg 124. Because the attachment point 135 of pivoting spring arm 130 to base 122 is offset from leg axis 125, the axis around which leg 124 pivots relative to base 122, collar 136 slides or moves along to different points on shaft 132 when leg 124 is pivoted. In other words, shaft 132 and leg 124 pivot on different axes causing the position of collar 136 on shaft 132 to vary as leg 125 is pivoted to different locations within its range of motion. As a result, the amount of spring force applied to collar 136, and hence to leg 124, varies depending on the position of leg 124 relative to base 122.

In the example of FIG. 11, the force exerted by spring 134 on collar 136 will tend to force or rotate leg 124 in a direction in which collar 136 moves closer to the far end of leg 124 and some of the compressed force associated with spring 134 is relieved. The spring force exerted on collar 136 that tends to force collar 136 closer to the far end of shaft 132 and this causes leg 124 to rotate in one direction or another depending on its present position. In the example of FIG. 11, since leg 124 is in the stowed position (also see FIGS. 2, 3, and 10), it will tend to be pushed up against the back of protective case 110 and may not rotate any further even though spring 134 is exerting force in that direction.

When stand 120 is not attached to protective case 110, leg 124 may rotate further. Alternately, base portion 122 may include a stop or other feature to keep leg 124 from rotating substantially further than that illustrated in FIGS. 10 and 11. However, the spring force will tend to keep leg 124 in this stowed position until a user intentionally applies force that overcomes the spring force to pivot leg 124 into the extended position.

Figure 12:
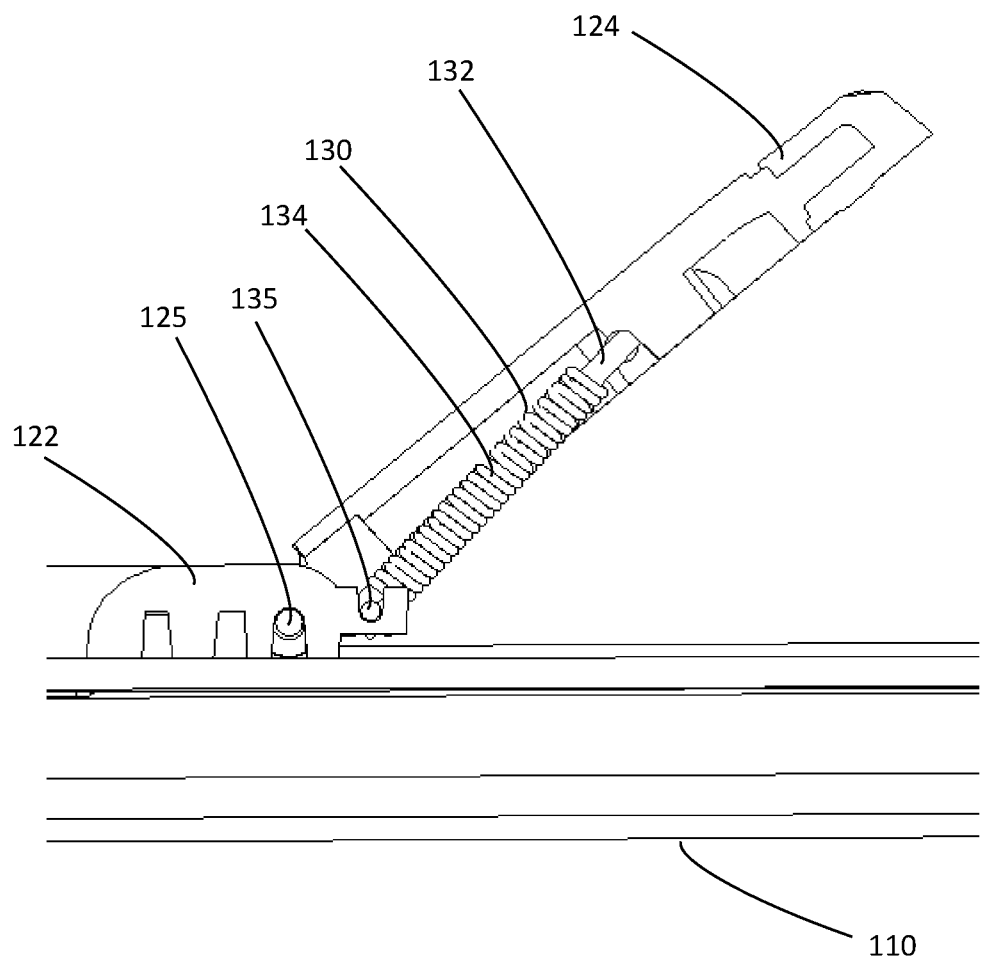
FIG. 12 illustrates a close up view of the pivoting spring arm and a portion of the leg of FIG. 11.
Figure 13:
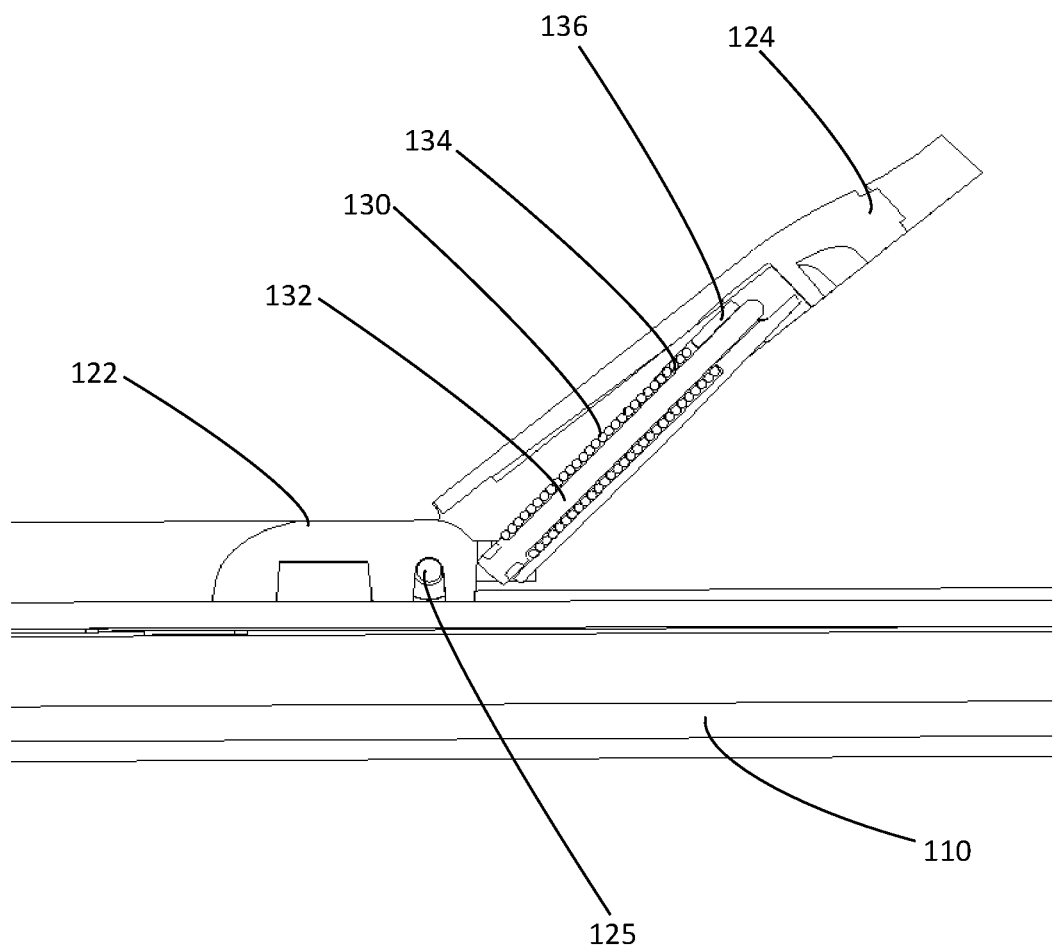
FIG. 13 illustrates a sectional view of the protective case and the leg of FIG. 12.

FIGS. 12 and 13 illustrate close up sectional views of leg 124 in the extended position. FIGS. 12 and 13 illustrate the alternative configuration of the leg relative to FIGS. 10 and 11. In FIG. 12, leg 124 is in the extended position. Stand 120 includes a stop or other feature that keeps leg 124 from pivoting or extending outward further than a preferred angle in order to prevent it from pivoting past a preferred angle. The position illustrated in FIG. 12 allows stand 120 to be used as illustrated in FIGS. 4-9.

In FIG. 13, spring 134 is exerting pressure on collar 136 which tends to push leg 124 into the extended position, at least until it hits a stop. The spring pressure tends to keep leg 124 in the extended position until a sufficient additional force is applied by a user to overcome the spring force and move leg 124 to the stowed position. Beneficially, this spring pressure tends to protect against undesired or inadvertent pivoting, folding, or lowering of legs 124 into the stowed positions.

As discussed previously, attachment point 135 of pivoting spring arm 130 to base 122 is offset from leg axis 125. Consequently, the rotation of leg 124 follows a different arc than that of pivoting spring arm 130. This difference results in movement of collar 136 along shaft 132 as leg 124 and pivoting spring arm 130 simultaneously pivot or rotate. In the examples of FIGS. 10-13, the relative positions of attachment point 135 and leg axis 125 have been chosen such that, within the range of motion of leg 124, spring 134 reaches a maximum compression at an intermediate point somewhere between the stowed position and the extended position. This maximum compression point, sometimes also referred to as an over-center point, results in an over-center behavior and results in spring 134 tending to push leg 124 one direction or the other from this intermediate or center point. In other words, when leg 124 is transitioned from the stowed position (FIGS. 10-11) toward the extended position (FIGS. 12-13), collar 136 moves along shaft 132 to further compress spring 134 such that spring 134 exerts increasing amounts of spring force resisting that movement until it passes the intermediate maximum spring compression point. After this intermediate point, the reverse occurs and collar 136 moves in the other direction along shaft 130 releasing some of the spring pressure which tends to push leg 124 toward the extended position.

Similarly, when leg 124 is transitioned from the extended position toward the stowed position, spring 134 exerts increasing force resisting that movement until it passes the intermediate maximum spring compression point. After reaching the intermediate maximum spring compression point, it tends to push leg 124 toward the stowed position. Beneficially, spring 134 tends to push leg 124 towards one of the extreme positions, regardless of which way it is being moved thereby reducing the chances that it remains somewhere in the middle of the transition path. This behavior makes the extending or stowing of the leg faster, easier, more reliable, and/or may require less force from the user. It may also cause leg 124 to better stay in place and/or snap into place in one of the preferred positions.

Although the maximum spring compression point is described as "over-center," this point is not necessarily at the physical center of the arc that is traced by leg 124. In some examples, the maximum compression point occurs when a center axis of shaft 132 passes through leg axis 125. At this point, collar 136 will be compressing spring 134 more than anywhere else in the arc or path. Moving either direction from this point will cause collar 136 to move further away from attachment point 135 thereby releasing some of the compression of spring 134. This relationship causes the over-center or bi-stable behavior described above.

While the examples provided herein are described with respect to use of a coil spring, other elements with springing or elastic properties may be used. While the examples provided herein illustrate the shaft extending through a coil spring, this configuration is not required. While the examples provided herein are discussed with respect to a spring element in compression, the design may be implemented using a spring or spring element that is in tension and reaches the over-center point when the spring element reaches the maximum tension in the arc of travel. In some examples, different spring elements may be substituted to provide more or less force in the movement of the legs. In some examples, stand 120 may include an adjustment feature for adjusting the tension of the spring on the pivoting spring arm in order to provide more or less force in the movement of the legs.

In some examples, more than one spring and/or more than one spring arm may be used with each leg. In some examples, a cover may be provided to cover one or more of the components of stand 120 to reduce the chances of pinching or injury to a user and/or to reduce the chances of the components being subjected to dirt or debris.

While many of the examples herein are discussed with respect to a stand having two legs, the improvements disclosed herein may be implemented in an apparatus having only one leg, three legs, four legs, or more legs. Further, the bi-stable configuration and characteristics disclosed herein may be used with other apparatuses having folding elements, even if those folding elements are not used as legs or feet.

While many of the examples herein are discussed with respect to stands that are attached or attachable to cases or covers for electronic devices, it should be understood that the disclosed stands and stand features may also be configured to be attached or attachable directly to an electronic device and/or may be integrated with the primary housing of the electronic device. The improvements herein may be configured as a case system that includes a case and a stand. In other examples, the improvements herein may be provided as a stand without an associated case or cover.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in other situations," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case system for use with a portable electronic device having a display screen, the protective case system comprising:
a protective case configured for removably receiving the portable electronic device; and
a stand removably attachable to a back surface of the protective case, the stand including:
a base portion;
two legs, wherein each leg is movably attached to the base portion along a respective leg axis and configured to pivot at the respective leg axis between a stowed position and an extended position, wherein the legs are configured to support the protective case in one or more viewing orientations on a substantially horizontal surface when the legs are in the extended positions; and
two pivoting spring arms, each pivoting spring arm attached to the base portion at a first end and attached to a respective one of the two legs at a second end, wherein each pivoting spring arm is configured to apply a spring force to the respective leg to alternately maintain the leg in the stowed position or in the extended position, wherein the applied spring force varies as the respective leg is transitioned between the stowed position and the extended position and reaches a maximum spring force at a point between the stowed position and the extended position such that each pivoting spring arm tends to force the respective leg into one of the stowed position or the extended position, and wherein the maximum spring force occurs when a centerline axis of the pivoting spring arm passes through the respective leg axis when the respective leg is pivoting.

2. The protective case system of claim 1 wherein each pivoting spring arm is pivotably attached to the base portion at the first end and engages the respective leg at the second end.

3. The protective case system of claim 2 wherein each pivoting spring arm is attached to the base portion at an attachment point that is offset from the respective leg axis.

4. The protective case system of claim 3 wherein a location of each pivoting spring arm attachment point results in an over-center configuration such that each pivoting spring arm tends to force the respective leg into one of the stowed position or the extended position depending on which side of the maximum spring force point the respective leg is located.

5. The protective case system of claim 4 wherein the maximum spring force point is equidistant from the stowed position and the extended position within a range of pivot of the respective leg.

6. The protective case system of claim 1 wherein each pivoting spring arm includes a shaft and a spring configured to exert force on a collar to move the collar along the length of the shaft.

7. The protective case system of claim 6 wherein the collar is attached to the respective leg.

8. The protective case system of claim 6 wherein the leg includes the collar.

9. A stand for use with a portable electronic device having a display screen, the stand comprising:
a base portion removably attachable to the portable electronic device or to a case for the portable electronic device;
two legs, each leg movably attached to the base portion along a respective leg axis and configured to pivot relative to the base portion at the respective leg axis, wherein each leg is further configured to pivot between a stowed position and an extended position, wherein the legs are configured to support the portable electronic device, directly or indirectly, in at least two different viewing orientations on a surface when the legs are in the extended position; and
two pivoting spring arms, each pivoting spring arm attached to the base portion at a first end and attached to a respective one of the two legs at a second end, wherein each pivoting spring arm is configured to apply a spring force to the respective leg to alternately maintain the leg in the stowed position or in the extended position, wherein the applied spring force varies as the respective leg is transitioned between the stowed position and the extended position and reaches a maximum spring force at a point between the stowed position and the extended position such that each pivoting spring arm tends to alternately force the respective leg into one of the stowed position or the extended position, and wherein the maximum spring force occurs when a centerline axis of each pivoting spring arm passes through the respective leg axis.

10. The stand of claim 9 wherein each pivoting spring arm is pivotably attached to the base portion at the first end and engages the respective leg at the second end.

11. The stand of claim 10 wherein each pivoting spring arm is attached to the base portion at an attachment point that is offset from the respective leg axis.

12. The stand of claim 11 wherein a location of each pivoting spring arm attachment point results in an over-center configuration such that each pivoting spring arm tends to force the respective leg into one of the stowed position or the extended position depending on which side of the maximum spring force point the leg is on.

13. The stand of claim 12 wherein the maximum spring force occurs at a center position.

14. The stand of claim 9 wherein each pivoting spring arm includes a shaft and a spring configured to exert force on a collar to move the collar along the length of the shaft.

15. The stand of claim 14 wherein the collar is attached to the respective leg.

16. The stand of claim 14 wherein the leg includes the collar.

17. A case system for use with a portable electronic device having a display screen, the case system comprising:
a case adapted for removably receiving the portable electronic device; and
a stand attached to a back surface of the case, the stand including:
a base;
a leg attached to the base along a leg axis and adapted to pivot relative to the base at the leg axis, wherein the leg is further adapted to pivot between a stowed position and an extended position, wherein the leg is further adapted to support the case and the installed portable electronic device in a viewing orientation on a substantially horizontal surface when the leg is in the extended position; and
a pivoting spring arm attached to the base at a first end and attached to the leg at a second end, wherein the pivoting spring arm is adapted to apply a spring force to the leg to alternately maintain the leg in the stowed position or in the extended position, wherein the applied spring force varies as the leg is transitioned between the stowed position and the extended position and reaches a maximum spring force at an intermediate position along an arc of pivot of the leg between the stowed position and the extended position such that the pivoting spring arm tends to alternately force the leg into one of the stowed position or the extended position, and wherein the pivoting spring arm is pivotably attached to the base at an attachment point that is offset from the leg axis such that the pivoting spring arm tends to alternately force the leg into one of the stowed position or the extended position depending on whether a centerline axis of the pivoting spring arm is on a first side or a second side of the leg axis.

* * * * *